United States Patent [19]

Brignard et al.

[11] 3,799,023

[45] Mar. 26, 1974

[54] ROTARY APPARATUS FOR CUTTING VEGETABLES

[76] Inventors: Francois C. Brignard, 1 bis rue du Marechal Joffre, Nice, France; Jean E. LeFranc, deceased, "La Montagne", late of Beaune, France by Suzanne M. Darmigny

[22] Filed: June 12, 1972

[21] Appl. No.: 263,757

[30] Foreign Application Priority Data
June 11, 1971   France.............................71.22127
July 13, 1971   France.............................71.26605

[52] U.S. Cl........................ 83/663, 83/444, 83/591
[51] Int. Cl............................................. B26d 1/12
[58] Field of Search .......... 83/356.3, 113, 118, 119, 83/165, 444, 448, 591, 663, 664, 665

[56] References Cited
UNITED STATES PATENTS
3,392,768   7/1968   Anliker................................. 83/113
1,898,160   2/1933   Aeschbach............................ 83/665
2,807,302   9/1957   Qualheim............................. 83/467

Primary Examiner—Willie G. Abercrombie
Attorney, Agent, or Firm—Otto John Munz

[57] ABSTRACT

Rotary apparatus for cutting vegetables has one or more removable rotary units with two opposite cutting arrangements which units are adapted to rotate in either direction, and is provided with a device to adjust the thickness of the cut. The apparatus has a cover which is operatively associated with a fixed hopper and a rotary hopper, one of the hoppers being used according to the position of the cover.

8 Claims, 9 Drawing Figures

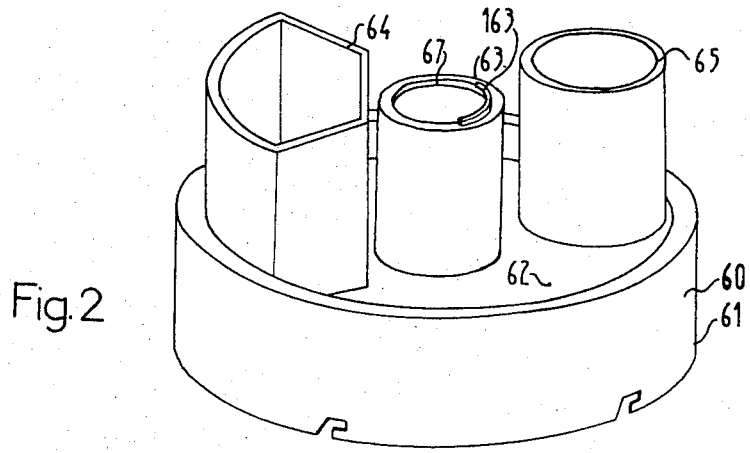
Fig. 2
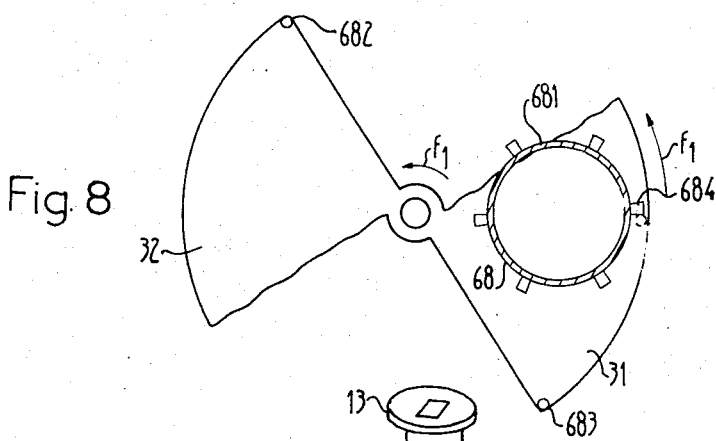
Fig. 8
Fig. 4
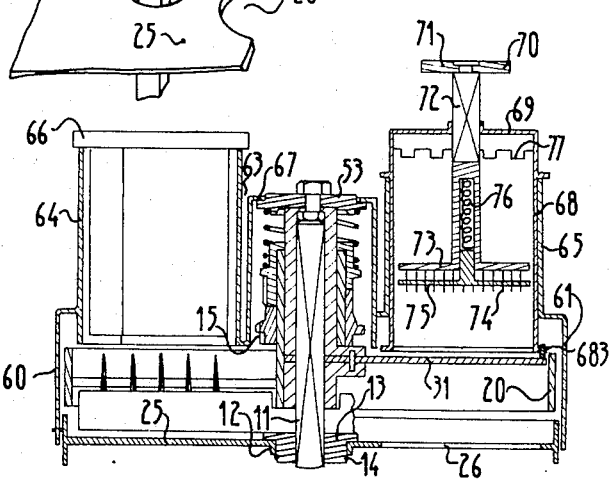
Fig. 1

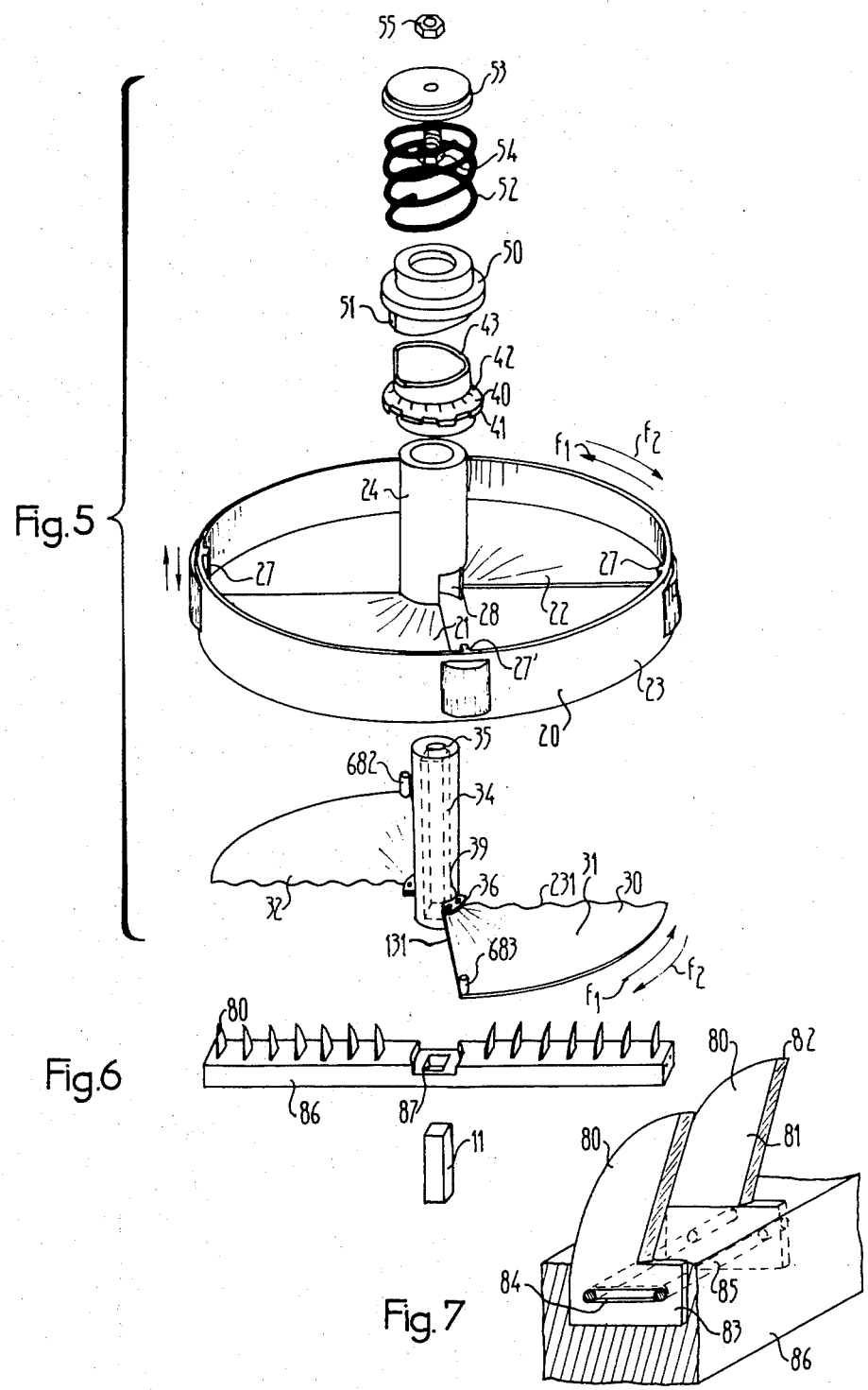

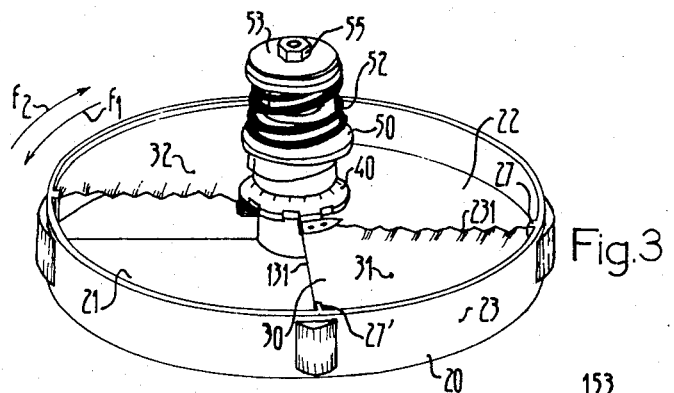
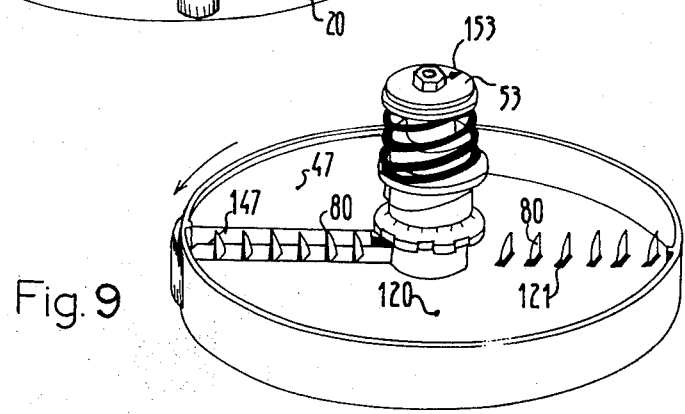

ROTARY APPARATUS FOR CUTTING VEGETABLES

CROSS-REFERENCES TO RELATED APPLICATION

This application discloses improvements to U.S. application Ser. No. 132,408, filed Apr. 8, 1971.

BACKGROUND OF THE INVENTION

1. Field of the Invention

A machine capable of performing all of the types of vegetable cutting that a housewife in her kitchen may have to do, for example, on a potato, or beetroot, and also on many other vegetables. This machine is of the class of non-specialized compact type apparatus, as opposed to large capacity type apparatuses which are used in restaurants and other large concerns, for whom compactness is not a primary consideration.

2. DESCRIPTION OF THE PRIOR ART

Rotary apparatuses which are already known for cutting vegetables have a gear case for a motor, a drive shaft with a vertical axis, a circular casing surmounting the said gear case, a rotary carriage or unit inside the casing and a cover able to support various accessories. The type of rotary carriage varies according to the type of cut to be made and has at least one platform and one cutting member the cutting part of which is displaced a certain height from the platform, the said height corresponding to the thickness of the cut and being adjustable by means placed in the gear case. The rotary unit is completed eventually by a member provided with blades parallel to each other and parallel with its axis of rotation.

The means for regulating the thickness of the cut are controlled by an adjustment button on one wall of the said gear box, which allows for the thickness of the cut to be adjusted from outside the apparatus, even while in operation. On the other hand, a number of different rotary carriages have to be provided according to the type of cut to be made.

A rotary carriage of this type generally uses as a cutting member a sectoral disc made up of at least two quadrant-shaped sectors; these sectors have a radial cutting edge that is straight or wavy according to the type of cut desired. Thus, according to the profile of the cutting edge of the said sectors, two rotary carriages assume different functions.

On the other hand, this rotary carriage is sometimes completed by an entirely metallic rotary member with parallel blades having a straight cutting edge.

On the other hand again, among the accessories able to be mounted on the casing cover, one type of apparatus makes use of a rotary hopper with a suitable pusher-cover on top or another type, a simple fixed hopper with a hand pusher.

Rotary apparatuses for cutting vegetables are also known to include a rotary carriage having a plate the surface of which consists of a succession of helical sectors separated by one or more cutting members having two cutting edges with different profiles. The rotary carriage can rotate in either direction, and depending on its direction asserts one function or another. It can for example cut large or small sized "allumettes" (match-sticks) according to the direction of rotation. All the same, because of their construction, these apparatuses are not equipped with any device for making continuous adjustment.

Many household apparatuses of this kind have been considered, but a housewife who would like to equip herself with apparatuses presently on the market for doing all the types of vegetable cutting, assuming that her family budget would allow her to do so, would find the amount of accomodating space required for them and their numerous accessories, difficult to fit into a modern kitchen.

SUMMARY OF THE INVENTION

The present invention has for an object an apparatus for home use for cutting vegetables in which the number of accessories is reduced to the minimum and at the same time allows for the making of all types of cuts that a housewife has to perform; for example, on potatoes, beetroot, as well as on many other vegetables (celery, carrots, etc . . . ).

The least one can require of a domestic vegetable cutter is for it to be compact and for it to be able to perform at least four operations. End results of such four operations could make slices of potato (crisps), rectangular parallelepidons (in the form of chips), "gaufrette" potatoes and "allumettes" (matchsticks), the thickness of these types of cuts being continuously adjustable in all cases. There is no apparatus at present capable of executing these four operations, except with the help of numerous accessories which are bulky in size.

The housewife may also wish to be able to make "julienne" pieces (diced potatoes), but she will then have to put the vegetable through her machine twice, if she is to avoid having to have a special accessory which is not justified from the economic and space standpoints unless she has to do this type of preparation often.

A rotary carriage according to the present invention is able to accomplish jobs previously done by two rotary units and at the same time allows for continuous adjustment of the thickness of the slice. With this in view the cutting member (the cutting part of which is displaced by an adjustable height relative to the platform as explained above) is provided with two opposite and different profiles. A motor which can rotate in both directions is utilized. Depending on the direction of rotation of the motor, one of two cutting profiles is active, the other is not, so that different cuts can be obtained according to the direction of rotation, both of the profiles being adjustable in height.

On the other hand, a rotary unit according to the present invention has its own device adjusting for the height of the cut. This is in contrast to previous rotary carriages which are provided with an adjustment button on the wall of the gear box and with a linkage transmitting the adjustment to the rotary carriage. Such a linkage is necessarily complicated, costly to make and to mount, and difficult to clean after use. In this case, of course it is not possible regulate the thickness of the cut during the operation, but experience has shown that the housewife only rarely makes use of this possibility. Rather, she complains of the loss of her time in cleaning the apparatus.

The present invention also provides for the rotary carriage rotating in one direction or in the other together with the using of either a fixed or a rotary hopper, which gives in theory four possible combinations, but in practice only three.

If two cutting profiles in one direction are wavy profiles that are symmetrical in relation to the axis, and the two cutting profiles in the other direction are anti-symmetrical wavy profiles, there is obtained:

A. With the fixed hopper, in one direction of rotation "allumettes" (matchsticks), in the other waffled crisps; and B. With the rotary hopper, "gaufrettes" in each case.

If the anti-symmetrical wavy cutting profile is replaced by a straight profile, there is obtained:

A. In one direction of the rotation, crisps regardless which hopper is used; and B. In the other direction of rotation, either wavy crisps or "gaufrettes."

If the wavy symmetrical profile is replaced by a straight profile, there is obtained:

A. In one direction of rotation, crisps regardless which hopper is used; and

B. In the other direction of rotation, either "allumettes" (matchsticks) or "gaufrettes."

It is this last example which is most useful for a housewife.

The use of a rotary hopper being known per se, the present invention provides for mounting on the same cover of the casing, a rotary hopper and a fixed hopper, the said cover being fixable on the casing of the apparatus in two different ways according to the hopper which is to be used.

Another object of the present invention is a rotary member with parallel blades which is simpler in construction than those of the prior art, and of which the blades have a profile better adapted to their function.

The present invention has also for an object a new device for the driving of the rotary hopper.

According to a first feature of the invention a detachable rotary carriage, which has an adjusting system and the ability to rotate in both directions, includes:

A. A knife-carrying plate has at least two quadrant shaped sectors with their radial edges sharpened, one straight-profiled, the other toothed. The arrangement is such that like profiles face the same way in movement, and the toothed profiles are offset radially from each other by half a tooth. These sectors have contact with a first sleeve having a square internal cross section which is driven by the shaft of the motor, likewise having a square cross section.

B. A platform that consist of an equal number of sectors peripherally is provided with a raised annular rim and is supported at its middle part by a second axial sleeve. This second sleeve, which receives telescopically the first sleeve of the knife-carrying plate, is provided at its base with indentations equal in number to the sectors of this plate. This is in order to allow its axial displacement relative to the first sleeve. The annular rim of the said platform is provided with two pairs of diametrically opposed projections, directed inwardly and destined to come into contact with the leading and trailing peripheral edges respectively of the sectors of the plate to allow the plate to transmit its rotational movement to the said platform.

C. Complementary adjustment members consists of an adjustment button and an adjustment socket, each in the shape of a cylindrical ring and each respectively provided with, on their opposing edges, a profile in the shape of a helical slope. The button ring is to bear on the central part of the said knife-carrying plate and at its base it is provided with a graduation. Its stroke is moreover limited by a rib co-acting at the end of the stroke with a boss provided on the plate. The socket ring is given an index for the adjustment of its position at an angle in accordance with the graduations of the button. It is moreover provided at its upper part with an annular shoulder forming a seat for a spiral spring.

D. The said spring itself and a washer are placed on top of it. This washer is provided with a hole in its middle for a bolt to go through.

E. The said bolt penetrates axially through the stack of these parts and is screwed at its upper end into a nut on which the said washer bears.

A cutting unit of this type has one further feature. The sectors of the plate, while they are filling the spaces of the platform are not tangents to the latter. A gap is made between them to allow for the passage of the parallel blades of the parallel-bladed rotary member when used.

According to another feature of the invention, the parallel-bladed rotary member comprises a number of blades embedded in an elongated block of plastic material, and each blade has a hooked profile.

According to another feature of the invention, the cover of the casing containing the rotary carriage is provided with two hoppers, namely a fixed hopper and a rotary hopper, and fixing means to the casing which places either the fixed hopper or the rotary hopper into an operative position.

According to another feature of the invention, a driving mechanism of the rotary hopper includes a toothed crown operatively connected with the inner rotary sleeve of the said hopper. Cooperating with the said toothed crown, two fingers with vertical axes are borne by the rotary carriage at two diametrically opposite points on the latter and on its edges foremost in the direction of movement corresponding to the way in which the rotary hopper is used.

BRIEF DESCRIPTION OF THE DRAWINGS

FIG. 1 shows in section and in elevation the upper part of a cutting apparatus according to the invention;

FIG. 2 shows in perspective a cover of the same, provided with a rotary hopper and a fixed hopper;

FIG. 3 shows in perspective a rotary unit of the same;

FIG. 4 shows in perspective a member which supports the rotary unit of FIG. 3;

FIG. 5 shows in an exploded view the parts of the rotary unit of FIG. 3, when disassembled;

FIG. 6 shows in perspective a rotary member with parallel blades;

FIG. 7 is an enlarged partial view of the rotary member of FIG. 6;

FIG. 8 is a top plan view of the rotary hopper driven by the knives; and

FIG. 9 shows in perspective a rotary unit for cutting vegetables into "julienne" pieces.

DESCRIPTION OF THE PREFERRED EMBODIMENT

Referring to FIG. 1, at 25 can be seen the upper wall of a casing of a cutting apparatus, the said casing (not shown) containing a drive motor and reduction and transmission members driving in rotation bey a vertical, square-sectioned shaft 11.

About the shaft 11, the upper wall 25 of the casing forms a circular shoulder 12 in which is placed a ring 13 that is outwardly circular and inwardly square. The ring 13 is held in place by a bushing 14. The wall 25 is pierced by a hole 26, through which fall the pieces of vegetable that are cut up by the apparatus.

On the square-sectioned shaft 11 there is placed a rotary carriage that is shown in FIG. 3, the component parts of which appear in the exploded view of FIG. 5.

A platform 20 includes two sectors 21 and 22 (see also FIG. 5) which are surrounded by a cylindrical ring 23, the whole being mounted on a cylindrical sleeve 24. The cylindrical sleeve 24 has two opposing notches such as 28 the purpose of which will be explained later. In addition, the cylindrical ring 23 has internal projections 27 and 27' the purpose of which will likewise become apparent later. The platform 20 is, for example, made of a plastic material.

A cutting member includes a plate 30 having two quadrant-shaped knives 31 and 32 that are mounted on a sleeve 34. The outer wall of the sleeve 34 is circular and operatively connected to the inner diameter of the sleeve 24. The inner cross sectional area of sleeve 34 is square, and operatively connects to the drive shaft 11. The sleeve 34 at its upper portion terminates with a circular hole 35. The sleeve 34 is, for example, made of a plastic material. The knives 31 and 32 have fingers 682 and 683 the purpose of which will likewise become clear later on.

The rotary carriage also has arranged in a superimposed manner respectively, on the sleeve 34 a ring 40, a ring 50, a flange spring 52, a washer 53, a bolt 54 and a nut 55. The ring 40 has a knurling 41 and a scale 42 and is provided with an upwardly extending helical slope portion 43. The inner diameter of portion 43 corresponds to the outer diameter of the sleeve 24, on which it is placed. The ring 50 has an inner diameter equal to the outer diameter of the sleeve 24 on which it is positioned. The ring 50 is provided with a downwardly extending helical slope portion 51 of the same pitch as the slope portion 43. The rings 40 and 50 are preferably made of a plastic material.

In order to assemble the rotary carriage of FIG. 3, utilizing the parts shown in FIG. 5, the ring 40 is engaged around the sleeve 24 of the platform 20 and the ring 50 is placed there above. Then the sleeve 34 of the plate 30 is positioned to operatively engage the sleeve 24 of the platform 20 taking care that the knives 31 and 32 are positioned in the free sectors between the sectors 21 and 22 of the platform 20. The central parts 36 of the knives 31 and 32 are inserted into the notches 28 of the sleeve 24. The spring 52 and the washer 53 are then positioned onto the ring 50. Then the bolt 54 is inserted into the sleeve 34. The spring 52 is compressed until the stem of the bolt 54 emerges from the hole 35 of the sleeve 34 and the nut is screwed on. A rotary carriage arrangement is thus obtained similar to that shown in FIG. 3. Notice that in this figure the rotary movement of the plate 30 is transmitted to the platform 20 by the projections 27 or 27' according to the direction of rotation communicated to the plate. On the other hand, by turning the knurled ring 40, the platform 20 can be raised or lowered, in relation to the plate 30, constituting the cutting member, i.e. the distance can be varied between the plane of the knives 31 and 32 and that of the sectors 21 and 22, whereby the thickness of the cut can be varied. A rib (or spur) 15 (FIG. 1) engages with the ring 40 which limits the rotation of this ring in both directions by contacting, at the end of its stroke, a boss 39 (FIG. 5), which is integral with the central part 36 of the cutting plate 30.

It can also be seen in FIGS. 3 and 5, that each of the knives 31 and 32 have a straight radial cutting edge such as 131 and a toothed cutting edge such as 231. According to the direction of rotation, only one edge comes into operation. The teeth of one knife on the other hand are offset from the teeth of the other knife for a reason which will become apparent later.

FIG. 2 shows a cover that covers the rotary carriage when the latter is placed on the shaft 11. This cover, referred to as a whole as 60, has a cylindrical part 61 and a flask 62. On the flask, there are a sleeve 63, a hopper 64 which is referred to as a fixed hopper, and a sleeve 65 of the rotary hopper. The sleeve 63 encloses the rings 40 and 50, the spring 52 and the washer 53. The sleeve 63 has on its upper part a collar 67 to receive the washer 53. The fixed hopper 64 has a cross section which is illustrated as polygonal in shape, that is to say a non circular type cylinder.

The sleeve 65 contains a rotary hopper which will be described later.

Of course, only one hopper is used at a time. The cover 60 can be placed on the apparatus in two different ways, and the hopper selected to be used is placed above the hole 26 of the wall 25.

The hopper-carrying cover 60 is fixed on the casing of the apparatus by a bayonnet arrangement as shown in FIG. 2 or by two pivoting straps of iron wire which bear on the cover at the opposite ends of one diameter.

In the practice of making crisps, a type of cut vegetable, the fixed hopper 64 is positioned above the hole 26 (i.e. the opposite way to that shown in FIG. 1), after having positioned the rotary carriage of FIG. 3 on the shaft 11 and after having previously adjusted the thickness of cut by moving the knurled ring 40, making use of the scale 42. A vegetable such as a potato is placed into the hopper 64 and is pushed by the application of the pusher 66. The motor is then energized to operate in the direction appropriate to the use of the straight edges of the knives. The potato descends by gravity into the hopper. Of course, the adjustment of the thickness of a cut cannot be made during the operation. However, the cover 60 may be easily removed and the ring 40 is at once accessible for adjustment thereof.

Further in the practice of making chips and other type of cut vegetable, the apparatus according to the invention utilizes a cutting member with parallel blades which includes a number of blades such as 80, having the shape shown in FIG. 6. These blades have a nose 81 in the shape of a hook, as seen in FIG. 7, ending in a point 82 which is the part of the blade which contacts the vegetable in the cutting thereof. With this type of arrangement, experience has shown that the vegetable is not pushed back towards the top of the hopper when it is contacted by the plurality of blades.

Blades 80 are mounted on a stand 83 which has a slit 84 for the passage of rods 85. The whole unit is embedded in a parallelepipedon 86 which is made of plastic material and has a square central hole 87 that is adapted to receive the square section of the drive shaft 11.

In contrast to what is decribed in the above mentioned specification, the sectors 21 and 22 of the platform 20 are not notched for the passage of the plurality of blades of the parallel-bladed cutting member. The sectors of the plate and those of the platform are constructed to allow betweem them radial spaces large enough for the passage of these blades. Experience has shown that this arrangement is satisfactory, particularly because of the structural arrangement provided for the parallel blades.

Further in the practice of making chips, the parallel-bladed cutting member is first positioned around the shaft 11 to rest on the ring 13. Then the cutting member as shown in FIG. 3 is placed thereon. The adjustment of the cutting thickness is then performed by driving action of the ring 40. The cover 60 is arranged in the opposite position to that shown in FIG. 1, i.e. with the fixed hopper 64 on the right, above the hole 26, and the potatoes are inserted one by one into the hopper 64 to obtain the desired crisps.

In the practice of making "gaufrette", another type of cut potatoes, the direction of rotation of the drive motor is reversed in order to put the wavy edges of the knives 31 and 32 into use. The cutting member with parallel blades is not used and the cover 60 is arranged as shown in FIG. 1. Thus the rotary hopper is now positioned above the hole 26; the hole 26.

An examination of FIGS. 1 and 8 reveals that the rotary hopper includes a cylindrical sleeve 68 that is adapted to be driven in rotation inside the sleeve 65 by means of a toothed crown 681 which engage fingers 682 and 683 which are carried by knives 31 and 32 at diametrically opposed points on the knife-carrying plate 30.

The cover 69 is penetrated by a pusher 70 that consist of a handle 71 mounted freely in rotation at the end of a square-sectioned shaft 72 which goes through the cover 69 in a hole likewise square-sectioned in such a way as to be driven in rotation when the inside sleeve of the rotary hopper turns.

The bottom of the square-sectioned shaft 72 terminates in a pusher-disc 73 that is provided with a number of spikes 74. The said spikes are utilized for spearing the vegetable to be cut. The spikes 74 extend through a mobile disc 75 which is urged downwardly by a spring 76.

In order to use the rotary hopper 65 for making "gaufrette" potatoes, the cover 69 is removed and one or more vegetables are placed in the hopper. A 71 is pressed which has the effect of applying the mobile disc 75 into contact with the fixed disc 73, the spikes 74 thereby digging into the vegetable. The latter is cut in steps with the rotation of the rotary carriage. At the end of the stroke the spikes 74 do not go down as low as the cutting surface and the vegetable is ejected by the spring 76, which allows for the vegetable to be cut to the end thereof without leaving any waste.

To make "allumettes" (matchsticks), the fixed hopper is used and the drive motor of the rotary carriage is made to rotate in the direction which puts the wavy edges of its knives into operative contact therewith. The teeth of the one being offset relative to the teeth of the other by half a tooth, the result is that, the antinodes of one set of teeth are positioned opposite to the antinodes of the others and a cutting at the point of correspondance of their nodes occurs. For this type of cut the parallel-bladed cutting-up member is not used.

To obtain the "julienne" type of cut, with only the devices and accessories described so far, the vegetables are first cut into chips (rotary carriage of FIGS. 3 or 5 being completed by the parallel-bladed cutting member of FIG. 6), and then the pieces of vegetable thus cut are put through the same apparatus again but with the parallel-bladed cutting member in FIG. 6 removed, being careful, of course, to introduce the pieces of vegetable vertically into the hopper.

Once can also, to obtain "julienne" pieces in a single operation, by using a rotary carriage as shown in FIG. 9. Its platform 120 extends over three-quarters of a circle and its knife 47 only covers a single quadrant. Also a parallel-bladed cutting member of the type that is shown in FIG. 6 and the rotary hopper are used. The platform 120 carries slits 121 for the passage of blades 80 of the parallel-bladed cutting member, these slits 121 are positioned opposite and in the same alignment as the cutting edge 147 of the knife 47. At the first passing of the parallel-bladed cutting-up member, the latter makes scores in the potato or vegetable, then the rotary hopper rotates about a quarter of a turn and, with the second passing of the parallel-bladed cutting member, the vegetable is cut by it and by the knife 47 into little cubes, thus making the "julienne" pieces.

It is necessary of course, that for each vegetable, the first passing should come before the second passing, otherwise the first turn of the rotary carriage would produce chips and not the desired "julienne" pieces. To this end, the washer 53 of the rotary carriage is engraved with an arrow 153 that is suitably orientated with relation to the cutting edge 147 of the knife 47. The operator starts the cut when the arrow 153 passes in front of a small circular flange 163 which is only concerned with one particular sector of the upper part of the collar 67 of the cover 60 (FIG. 2).

As is shown in FIGS. 1 and 8, the drive device of the rotary hopper 65 consists of a toothed crown 681 that is operatively connected with the movable sleeve 68 (FIG. 1) of this hopper. Two fingers, 682 and 683, of which only finger 683 appears in FIG. 1, are carried by knives 31 and 32 of the plate 30 at diametrically opposed points on the latter and adjacent to the straight cutting edge of these knives. The direction of rotation of the plate is such that the fingers lead when only the toothed edges of the knives are used. The result of this is that the toothed crown 681 has rotated the required quarter-turn in the direction of the arrow $f_1$ because of the effect of the engagement of the fingers 682 and 683 in its teeth such as 684 before the toothed edges of the knives come into contact with the vegetables to be cut.

Of course, the fingers which drive the teeth 684 of the rotary hopper 68, instead of being the fingers 682 and 683 that are fixedly attached to the knives, can be fixedly attached to the cylinder 23 of the platform 20. The arrangement of fingers contacting the outside of the crown 681 of the rotary hopper 68, instead of contacting the inside, allows the rotary hopper to be rotated a quarter turn with each passage of the blades, whether "gaufrette" or "julienne" pieces are concerned. The appearance of the cut pieces is thereby improved.

We claim:

1. Apparatus for cutting vegetables comprising
a rotary unit mounted on a drive shaft incorporating at least a first element having a platform and a second element having a cutting member and adjustment means to move one element in relation to the other in the direction of the axis of the drive shaft, wherein,
said first element including a sleeve, two quadrant-shaped sectors and a peripheral crown, said second element including a sleeve adapted to slide in the sleeve of the first element and two quadrant-shaped cutting sectors each defined by two opposite cutting edges of different profile, said adjustment means including a first graduated ring provided with a helical slope and positioned on the sleeve of the first element, a second ring provided with a helical slope of the same pitch as the first and positioned on the said sleeve of the first element, and a spring.

2. Apparatus according to claim 1, wherein said rotary unit includes a third element consisting of a parallel-bladed cutting member and incorporating a plurality of hooked blades.

3. Apparatus according to claim 2, wherein the said plurality of hooked blades are mounted on a parallelepiped block.

4. Apparatus according to claim 1, wherein said drive shaft is vertical and square in cross-section and wherein the internal cross section of the sleeve of the second element is square to receive said shaft.

5. Apparatus according to claim 1, wherein at least one of the said cutting edges is wavy.

6. Domestic apparatus for cutting vegetables comprising, in combination:
a casing incorporating a motor adapted to be driven in rotation in either direction the lower end of a non-circular cross sectioned vertical shaft, the said casing being provided with an exit spout for exiting the cut bits of vegetable,
a generally circular hood, provided with a fixed-feed hopper, a rotary hopper adapted to be driven in rotation and furnished with a rotary pusher, the said hood being in addition provided with fixing means onto the said casing selectively allowing one or the other hopper to be placed above the said exit spout,
a range of rotary carriages adapted to be placed on the upper end of the non-circular cross sectioned shaft, one of the said rotary carriages at least incorporating a circular platform provided with a cylindrical sleeve and a cutting member including at least two different and opposite profiles and provided with a cylindrical sleeve adapted to slide inside the sleeve of the platform, the said sleeve of the cutting member having an internal cross section to receive the non-circular cross section of the said drive shaft, the said rotary carriage being provided in addition with self-contained means for making the sleeve of the platform slide in relation to the cutting member and to thus selectively vary the thickness of the cut, the nature of the cut depending both on the direction of rotation of the non-circular cross sectioned vertical shaft and on whether the fixed hopper or the rotary hopper is used.

7. Apparatus according to claim 6, wherein the cutting member of a rotary carriage at least includes two linear profiles and two out of phase wavy profiles, respectively opposite to the linear profiles, whereby, according to the direction of rotation of the said shaft and according to whether one or the other hopper is used, whereby there is selectively obtained crisps, "gaufrette" cuts, or "allumettes" cuts.

8. Apparatus according to claim 7, wherein the range of rotary carriages is completed by a parallel-bladed cutting member, provided with a non-circular cross section of the same size as the non-circular cross section of the said drive shaft, the said cutting member being positioned about said shaft resting on a ring whose height is independent of the said self-contained adjustment means, whereby the fixed hopper permits the cutting of chips of a controlled thickness.

* * * * *